United States Patent
Maekawa

(10) Patent No.: US 9,538,026 B2
(45) Date of Patent: Jan. 3, 2017

(54) DISPLAY APPARATUS, IMAGE PROCESSING APPARATUS, DISPLAY METHOD, AND COMPUTER READABLE MEDIUM FOR CONTROLLING AN OPERATION OF A DISPLAY PROCESS

(71) Applicant: FUJI XEROX CO., LTD., Tokyo (JP)

(72) Inventor: Takao Maekawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/700,261

(22) Filed: Apr. 30, 2015

(65) Prior Publication Data

US 2016/0191732 A1 Jun. 30, 2016

(30) Foreign Application Priority Data

Dec. 24, 2014 (JP) ................. 2014-260381

(51) Int. Cl.
*H04N 1/00* (2006.01)
*G06F 3/0482* (2013.01)
*G06F 3/0484* (2013.01)

(52) U.S. Cl.
CPC ........ *H04N 1/00437* (2013.01); *G06F 3/0482* (2013.01); *G06F 3/0484* (2013.01); *H04N 1/0048* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| 2001/0038462 A1* | 11/2001 | Teeuwen ............ H04N 1/00204 358/1.15 |
| 2002/0118387 A1* | 8/2002 | Patton ................ G06F 3/1204 358/1.15 |
| 2008/0174818 A1* | 7/2008 | Kanamoto ........... G06F 3/1204 358/1.15 |
| 2009/0116058 A1* | 5/2009 | Yoshimura ......... H04N 1/00408 358/1.15 |

FOREIGN PATENT DOCUMENTS

JP 2014-99126 A 5/2014

* cited by examiner

*Primary Examiner* — Thomas D Lee
(74) *Attorney, Agent, or Firm* — Sughrue Mion, PLLC

(57) ABSTRACT

A display apparatus includes a display and an acceptance controller. The display displays on a display unit a list of processing images, each of which is an image representing a unit of processing. The acceptance controller restricts acceptance of an operation for a different processing image whose display position moves in accordance with an action of one processing image.

14 Claims, 12 Drawing Sheets

FIG. 4A

| | | | 113 |
|---|---|---|---|
| 11 — SCAN | READING IN PROGRESS | SCAN.pdf | 12 |
| 12 — PRINT | READY FOR PRINTING | CONTRACT.doc | 0/20 |
| 13 — PRINT | PRINTING IN PROGRESS | SPECIFICATION.doc | 5/6 |
| 14 — FAX | SENDING IN PROGRESS | 0451234567 | 4/8 |
| 15 — PRINT | READY FOR SENDING | DOCUMENT.doc | 0/10 |

FIG. 4B

| | | | 113 |
|---|---|---|---|
| 11 — SCAN | READING IN PROGRESS | SCAN.pdf | 12 |
| 12 — PRINT | READY FOR PRINTING | CONTRACT.doc | 0/20 |
| 14 — FAX | SENDING IN PROGRESS | 0451234567 | 4/8 |
| 15 — PRINT | READY FOR SENDING | DOCUMENT.doc | 0/10 |

FIG. 4C

| | | | 113 |
|---|---|---|---|
| 11 — SCAN | READING IN PROGRESS | SCAN.pdf | 12 |
| 12 — PRINT | READY FOR PRINTING | CONTRACT.doc | 0/20 |
| 14 — FAX | SENDING IN PROGRESS | 0451234567 | 4/8 |
| 15 — PRINT | READY FOR SENDING | DOCUMENT.doc | 0/10 |

FIG. 4D

| | | | 113 | |
|---|---|---|---|---|
| 11 — SCAN | READING IN PROGRESS | SCAN.pdf | 12 | } OPERATION IS PERMITTED |
| 12 — PRINT | READY FOR PRINTING | CONTRACT.doc | 0/20 | |
| 14 — FAX | SENDING IN PROGRESS | 0451234567 | 4/8 | } OPERATION IS PROHIBITED |
| 15 — PRINT | READY FOR SENDING | DOCUMENT.doc | 0/10 | |

FIG. 4E

| | | | 113 | |
|---|---|---|---|---|
| 11 — SCAN | READING IN PROGRESS | SCAN.pdf | 12 | } OPERATION IS PERMITTED |
| 12 — PRINT | READY FOR PRINTING | CONTRACT.doc | 0/20 | |
| 14 — FAX | SENDING IN PROGRESS | 0451234567 | 4/8 | } OPERATION IS PROHIBITED |
| 15 — PRINT | READY FOR SENDING | DOCUMENT.doc | 0/10 | |

FIG. 4F

| | | | 113 | |
|---|---|---|---|---|
| 11 — SCAN | READING IN PROGRESS | SCAN.pdf | 12 | |
| 12 — PRINT | READY FOR PRINTING | CONTRACT.doc | 0/20 | } OPERATION IS PERMITTED |
| 14 — FAX | SENDING IN PROGRESS | 0451234567 | 4/8 | |
| 15 — PRINT | READY FOR SENDING | DOCUMENT.doc | 0/10 | |

FIG. 5A

| | | | | |
|---|---|---|---|---|
| 11— | SCAN | READING IN PROGRESS | SCAN.pdf | 12 |
| 12— | PRINT | READY FOR PRINTING | CONTRACT.doc | 0/20 |
| 13— | PRINT | PRINTING IN PROGRESS | SPECIFICATION.doc | 3/6 |
| 14— | FAX | SENDING IN PROGRESS | 0451234567 | 4/8 |
| 15— | PRINT | READY FOR SENDING | DOCUMENT.doc | 0/10 |

113

OPERATION IS PERMITTED

FIG. 5B

| | | | | |
|---|---|---|---|---|
| 11— | SCAN | READING IN PROGRESS | SCAN.pdf | 12 |
| 12— | PRINT | READY FOR PRINTING | CONTRACT.doc | 0/20 |
| 13— | PRINT | PRINTING IN PROGRESS | SPECIFICATION.doc | 4/6 |
| 14— | FAX | SENDING IN PROGRESS | 0451234567 | 4/8 |
| 15— | PRINT | READY FOR SENDING | DOCUMENT.doc | 0/10 |

113

OPERATION IS PROHIBITED

FIG. 6A

| | | | | |
|---|---|---|---|---|
| 11— | SCAN | READING IN PROGRESS | SCAN.pdf | 12 |
| 12— | PRINT | READY FOR PRINTING | CONTRACT.doc | 0/20 |
| 13— | PRINT | PRINTING IN PROGRESS | SPECIFICATION.doc | 5/6 |
| 14— | FAX | SENDING IN PROGRESS | 0451234567 | 4/8 |
| 15— | PRINT | READY FOR SENDING | DOCUMENT.doc | 0/10 |

113

OPERATION IS PERMITTED

FIG. 6B

| | | | | |
|---|---|---|---|---|
| 11— | SCAN | READING IN PROGRESS | SCAN.pdf | 12 |
| 12— | PRINT | READY FOR PRINTING | CONTRACT.doc | 0/20 |
| 13— | PRINT | PRINTING IN PROGRESS | SPECIFICATION.doc | 5/6 |
| 14— | FAX | SENDING IN PROGRESS | 0451234567 | 4/8 |
| 15— | PRINT | READY FOR SENDING | DOCUMENT.doc | 0/10 |

113

OPERATION IS PROHIBITED

FIG. 6C

|    |       |                     |                  |      |                          |
|----|-------|---------------------|------------------|------|--------------------------|
| 16 | PRINT | READY FOR PRINTING  | DESIGN DOCUMENT.doc | 0/20 |                       |
| 11 | SCAN  | READING IN PROGRESS | SCAN.pdf         | 12   |                          |
| 12 | PRINT | READY FOR PRINTING  | CONTRACT.doc     | 0/20 | OPERATION IS PROHIBITED |
| 13 | PRINT | PRINTING IN PROGRESS| SPECIFICATION.doc| 5/6  |                          |
| 14 | FAX   | SENDING IN PROGRESS | 0451234567       | 4/8  |                          |

|    |       |                     |                  |      |                         |
|----|-------|---------------------|------------------|------|-------------------------|
| 16 | PRINT | READY FOR PRINTING  | DESIGN DOCUMENT.doc | 0/20 |                       |
| 11 | SCAN  | READING IN PROGRESS | SCAN.pdf         | 12   |                         |
| 12 | PRINT | READY FOR PRINTING  | CONTRACT.doc     | 0/20 | OPERATION IS PERMITTED |
| 13 | PRINT | PRINTING IN PROGRESS| SPECIFICATION.doc| 5/6  |                         |
| 14 | FAX   | SENDING IN PROGRESS | 0451234567       | 4/8  |                         |

113

DISPLAY APPARATUS, IMAGE PROCESSING APPARATUS, DISPLAY METHOD, AND COMPUTER READABLE MEDIUM FOR CONTROLLING AN OPERATION OF A DISPLAY PROCESS

CROSS-REFERENCE TO RELATED APPLICATIONS

This application is based on and claims priority under 35 USC 119 from Japanese Patent Application No. 2014-260381 filed Dec. 24, 2014.

BACKGROUND (i) Technical Field

The present invention relates to a display apparatus, an image processing apparatus, a display method, and a computer readable medium.

(ii) Related Art

In the case where a display position of information to be selected by a user changes, for example, if the display position changes immediately before the user selects the information, an erroneous operation may occur.

SUMMARY

According to an aspect of the invention, there is provided a display apparatus including a display and an acceptance controller. The display displays on a display unit a list of processing images, each of which is an image representing a unit of processing. The acceptance controller restricts acceptance of an operation for a different processing image whose display position moves in accordance with an action of one processing image.

BRIEF DESCRIPTION OF THE DRAWINGS

Exemplary embodiments of the present invention will be described in detail based on the following figures, wherein:

FIGS. 4A to 4F are diagrams for explaining an example of a process for causing a job image whose display position is moving to enter a state in which a user operation is prohibited;

FIGS. 5A and 5B are diagrams for explaining an example of a process for causing a job image to enter the state in which a user operation is prohibited before the display position of the job image moves;

FIGS. 6A to 6D are diagrams for explaining another example of the process for causing a job image whose display position is moving to enter the state in which a user operation is prohibited;

DETAILED DESCRIPTION

Hereinafter, exemplary embodiments of the present invention will be described in detail with reference to the accompanying drawings.

<Hardware Configuration of Image Processing Apparatus>

Figure 1:
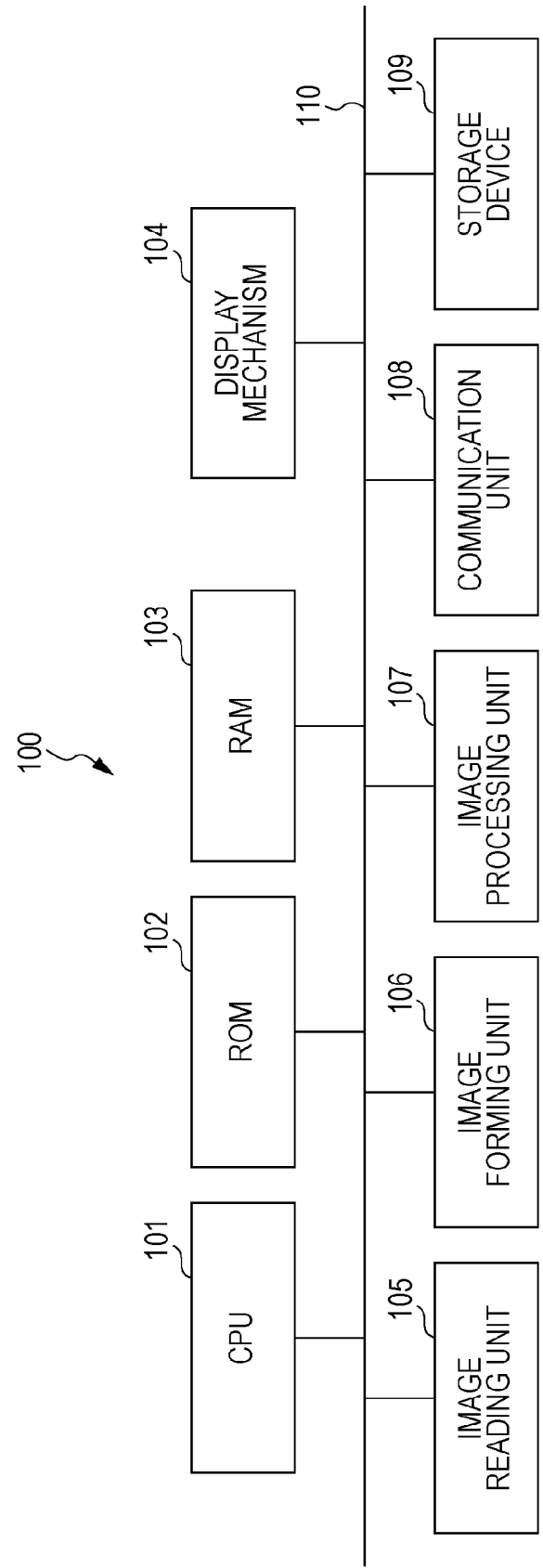
FIG. 1 is a diagram illustrating an example of a hardware configuration of an image processing apparatus according to an exemplary embodiment.

FIG. 1 is a diagram illustrating an example of a hardware configuration of an image processing apparatus 100 according to an exemplary embodiment. The image processing apparatus 100 according to the exemplary embodiment is an apparatus which has, for example, a scan function, a print function, a copy function, a facsimile function, and the like. The image processing apparatus 100 includes a central processing unit (CPU) 101, a read only memory (ROM) 102, a random access memory (RAM) 103, a display mechanism 104, an image reading unit 105, an image forming unit 106, an image processing unit 107, a communication unit 108, and a storage device 109. Each of these functional units is connected to a bus 110, and exchanges data via the bus 110. In the exemplary embodiment, as an example of a display apparatus and an image processing apparatus, the image processing apparatus 100 is used. Furthermore, as an example of an image processing unit, the image reading unit 105, the image forming unit 106, the image processing unit 107, and the communication unit 108 are used.

The CPU 101 executes various types of software such as an operating system (OS) and an application. Furthermore, the ROM 102 stores a control program executed by the CPU 101. The CPU 101 reads out the control program stored in the ROM 102, and executes the control program using the RAM 103 as a work area. When the control program is executed by the CPU 101, each function in the image processing apparatus 100 is implemented. Accordingly, for example, a predetermined display is provided on the display mechanism 104, and reading of an original copy is performed by the image reading unit 105.

The program that is executed by the CPU 101 may be provided in a state of being stored in a computer-readable recording medium such as a magnetic recording medium (a magnetic tape, a magnetic disk, or the like), an optical recording medium (an optical disk or the like), a magneto-optical recording medium, or a semiconductor memory. Furthermore, the program may be downloaded to the image processing apparatus 100 using a communication unit such as the Internet.

The display mechanism 104 is configured by, for example, a liquid crystal touch panel display (hereinafter, referred to as a touch panel), and displays data and the like related to the image processing apparatus 100. Furthermore, the display mechanism 104 receives an operation from a user by detecting contact with a displayed screen by the user. As a unit which detects contact, any unit may be used, such as a unit which detects contact based on pressure by the contact or a unit which detects contact based on static electricity of a contacted object.

The display mechanism 104 displays a list of jobs executed by the image processing apparatus 100. A job indicates a unit of processing related to image data executed by the image processing apparatus 100. A print job, a scan job, and a facsimile job are examples of jobs. The print job indicates processing for printing image data using the print function. The scan job indicates processing for reading a document and generating image data which represents an image of the read document, using the scan function. The facsimile job indicates processing for transmitting image data to an external apparatus as a destination, using the facsimile function.

The image reading unit 105 reads a document, and generates image data which represents an image of the read document. In this example, the image reading unit 105 is, for example, a scanner. The scanner may adopt a charge coupled devices (CCD) method in which reflected light relative to light radiated onto an original copy from a light source is reduced by a lens and is received by a CCD, or a contact image sensor (CIS) method in which a CIS receives reflected light relative to light radiated in order onto an original copy from a light emitting diode (LED) light source.

The image forming unit 106 includes a printing mechanism which forms an image on a recording medium such as paper. In this example, the image forming unit 106 is, for example, a printer. The printer may adopt an electrophotographic method in which toner adhered to a photoreceptor is transferred onto a recording medium and an image is formed, or an ink jet method in which ink is ejected onto a recording medium and an image is formed.

The image processing unit 107 performs image processing, such as color correction, tone correction, and the like, on received image data. The image processing unit 107 generates image-processed image data, and outputs the generated image data to the image forming unit 106.

The communication unit 108 is connected to a communication line (not illustrated), and functions as a communication interface which communicates with an external apparatus connected to the communication line. For example, when the facsimile function is executed, image data of a document read by the image reading unit 105 is transmitted to the external apparatus as a destination by the communication unit 108.

The storage device 109 includes a storage area such as a hard disk device. For example, the storage device 109 stores data received by the communication unit 108, data generated by the image processing apparatus 100, and the like.

<Functional Configuration of Image Processing Apparatus>

Figure 2:
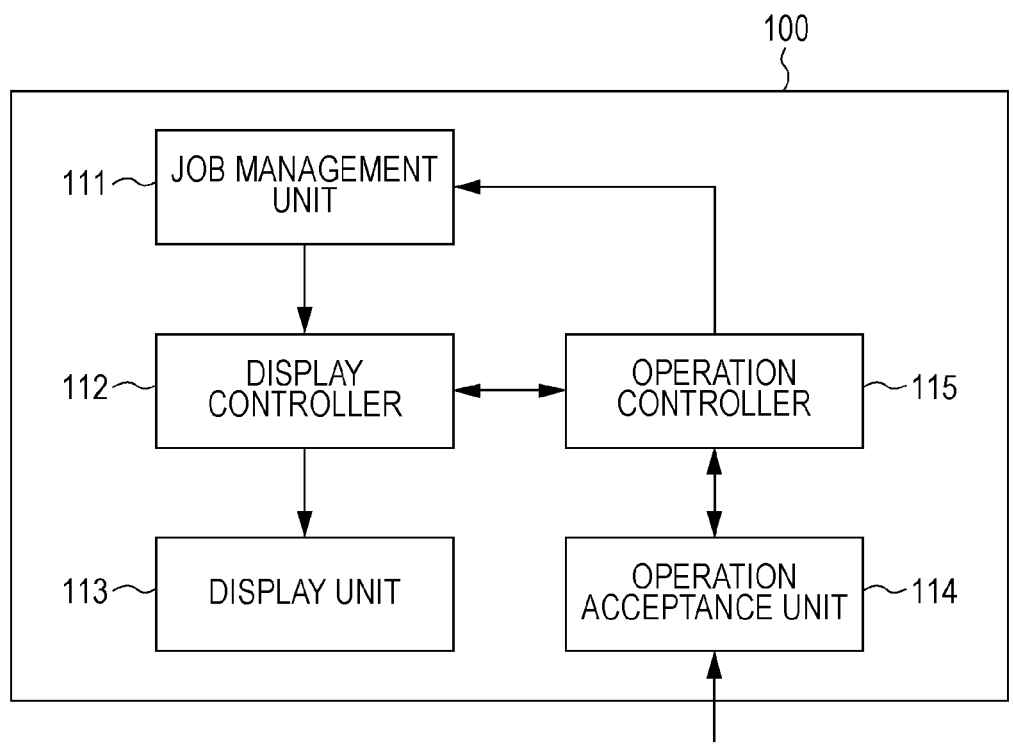
FIG. 2 is a block diagram illustrating an example of a functional configuration of the image processing apparatus according to the exemplary embodiment.

Next, a functional configuration of the image processing apparatus 100 according to the exemplary embodiment will be described. FIG. 2 is a block diagram illustrating a functional configuration example of the image processing apparatus 100 according to the exemplary embodiment. The image processing apparatus 100 includes a job management unit 111 which holds and manages job information, a display controller 112 which controls display contents of a display unit 113, and the display unit 113 on which an image is displayed under the control of the display controller 112. Furthermore, the image processing apparatus 100 includes an operation acceptance unit 114 which accepts an operation by a user, and an operation controller 115 which controls whether or not to accept an operation by the operation acceptance unit 114 and performs processing for the accepted operation.

The job management unit 111 holds and manages information of jobs executed by the image processing apparatus 100. The job information includes, for example, image data to be processed, the type of a job, such as a print job or a scan job, and the progress status of a job, such as ready-for-printing or scanning-in-progress. Furthermore, the job information includes, for example, the name of data to be processed, such as the name of a document to be printed or the name of a document to be scanned, the volume of data to be processed, such as the number of pages to be printed, the name of a user who issued an instruction for generating a job, the date and time when a job was generated, and the name of a user as a transmission destination of image data. Moreover, the job information includes information regarding the order in which jobs are to be executed by the image processing apparatus 100. The job management unit 111 updates such job information in accordance with a processing status and a user operation for the image processing apparatus 100.

For example, for a print job, when a print instruction is issued from a different external apparatus, the job management unit 111 adds a new print job. Furthermore, when printing by the image forming unit 106 is completed, the job management unit 111 deletes information of the completed print job. Moreover, for a scan job, for example, when a user performs an operation for executing the scan function, the job management unit 111 adds a new scan job. When generation of image data by the image reading unit 105 is completed, the job management unit 111 deletes information of the completed scan job.

For example, for a facsimile job, when the user performs an operation for executing the facsimile function, the job management unit 111 newly adds a facsimile job. Furthermore, when transmission of image data to a destination by the communication unit 108 is completed, the job management unit 111 deletes information of the completed facsimile job.

Moreover, for example, when the user performs an operation for canceling a job, the job management unit 111 deletes information of the canceled job.

The display controller 112, which is an example of a display, displays a job list on the display unit 113, based on information of jobs held in the job management unit 111. On the job list, an image which represents a job (hereinafter, referred to as a job image) is indicated for each job. In this example, the display controller 112 updates the display contents of the job list on the display unit 113 when a job is newly added or information of a job is deleted in accordance with completion of the job by the job management unit 111. Furthermore, the display controller 112 updates the display contents of the job list in accordance with the progress status of a job in the image processing apparatus 100.

For example, when a job is completed or when a job is canceled, the display controller 112 updates the display contents of the job list to delete a job image corresponding to the job and change the display position of a different job image. Furthermore, for example, when a job is newly added, the display controller 112 updates the display contents of the job list to add a new job image and change the display position of a different job image. Moreover, for example, when printing progresses and the number of printed pages increases, the display controller 112 updates the display contents of the job list to change the contents of the progress status of the job which is being displayed. In the exemplary embodiment, a job image is used as an example of a processing image.

Furthermore, to update the display contents of the job list, the display controller 112 outputs to the operation controller 115 information of the display contents to be updated.

Moreover, when a job is selected from the job list by the user, the display controller 112 newly displays detailed information regarding the selected job, a button for canceling the job, and the like on the display unit 113.

The display unit 113 is a touch panel of the display mechanism 104, and displays information of the job list and the like, under the control of the display controller 112.

The operation acceptance unit 114, which is an example of an acceptance unit, detects a contact operation by the user on the touch panel, and accepts an operational input by the user. For example, the operation acceptance unit 114 accepts an operation for a job image in the job list displayed on the display unit 113.

The operation controller 115, which is an example of an acceptance controller, determines the propriety of a user operation for each job image, based on information of the display contents of the job list received from the display controller 112. In this example, the operation controller 115 controls the operation acceptance unit 114 to restrict the acceptance of an operation for a job image whose display position moves on the display unit 113 by updating of the display contents of the job list. When acceptance of an operation is restricted, for example, even if a user operation is performed for a job image, the job image enters a state in which an operation is not acceptable by the operation acceptance unit 114. That is, a user operation for the job image on the touch panel becomes prohibited. On the other hand, for a job image whose display position does not move even when the display contents of the job list are updated, the operation controller 115 determines such an image as a job image for which a user operation is permitted. Therefore, the acceptance of an operation is not restricted for such an image. That is, the job image whose display position does not move remains in a state in which an operation is acceptable.

Furthermore, the operation controller 115 performs processing for the operation accepted by the operation acceptance unit 114. For example, when the operation acceptance unit 114 accepts an operation for selecting a job, if the selected job is a job for which a user operation is permitted, the operation controller 115 notifies the display controller 112 that the job has been selected. Upon notification, the display controller 112 displays detailed information of the selected job, a button for cancellation, and the like. Moreover, for example, when an operation for canceling the job is accepted by the operation acceptance unit 114, the operation controller 115 notifies the job management unit 111 that the job is to be deleted.

Thus, as described above, by execution of the control program by the CPU 101, the functions of the job management unit 111, the display controller 112, the operation acceptance unit 114, and the operation controller 115 are implemented. Furthermore, the display unit 113 is implemented by the display mechanism 104. Moreover, information of a job managed by the job management unit 111 is, for example, stored in the storage device 109.

<Explanation of Processing Procedure for Updating Display Contents of Job List>

Figure 3:
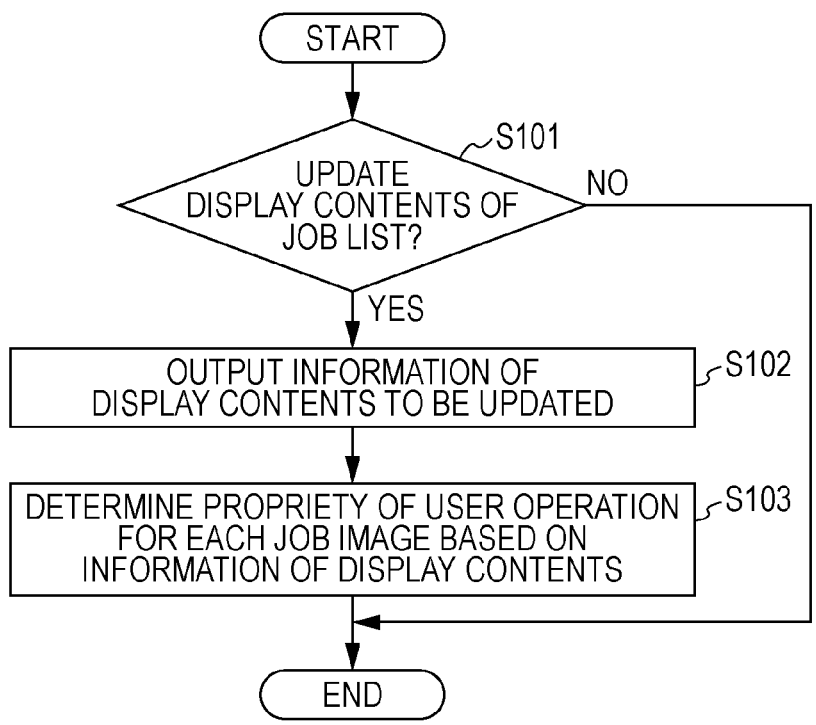
FIG. 3 is a flowchart illustrating an example of a processing procedure for updating display contents of a job list.

Next, a process for updating display contents of a job list by the image processing apparatus 100 will be described. FIG. 3 is a flowchart illustrating an example of a processing procedure for updating the display contents of the job list. The image processing apparatus 100 repeatedly executes each processing operation illustrated in FIG. 3 at fixed time intervals.

First, the display controller 112 determines whether or not to update the display contents of the job list, based on job information held in the job management unit 111 (step 101). For example, when a job is completed or a job is newly added by the job management unit 111, the display controller 112 determines to update the display contents. Furthermore, for example, when processing for a job progresses and the display contents are to change, the display controller 112 determines to update the display contents.

When a positive determination (YES) is made in step 101, the display controller 112 outputs to the operation controller 115 information of the display contents to be updated (step 102). For example, when a job is completed, the display controller 112 outputs to the operation controller 115 information of a job image to be deleted from the job list and a different job image whose display position moves in accordance with the deletion of the job image. Furthermore, for example, when a job is newly added, the display controller 112 outputs to the operation controller 115 information of a newly added job image and a different job image whose display position moves in accordance with the addition of the job image. On the other hand, when a negative determination (NO) is made in step 101, the processing flow ends.

Next, based on the information of the display contents of the job list received from the display controller 112, the operation controller 115 determines the propriety of a user operation for each job image (step 103). In this example, the operation controller 115 determines that a user operation for the job image whose display position is moving on the display unit 113 is prohibited. Furthermore, even after the movement of the job image is completed, the operation controller 115 determines that an operation for the job image is prohibited until a predetermined time period has passed. Moreover, for a newly added job image, the operation controller 115 determines that an operation for the job image is prohibited until a predetermined time period has passed since the addition of the job image to the job list. Furthermore, the operation controller 115 controls the operation acceptance unit 114 not to accept a user operation for the job image for which it is determined that an operation is prohibited. Then, the processing flow ends.

Furthermore, while the display contents of the job list are being updated, for example, while the job image is moving, the display controller 112 repeatedly performs positive determination (YES) in step 101, and outputs information of the display contents to the operation controller 115 in step 102. That is, while the display contents are being updated, the contents are continuously being output to the operation controller 115. Based on the information received, the operation controller 115 determines the propriety of an operation for each job in step 103. Thus, the operation controller 115 monitors the updating status of the display of the job list.

<Specific Example of Process for Updating Display Contents of Job List>

Next, a process for updating display contents of a job list by the image processing apparatus 100 will be described with specific examples. FIGS. 4A to 4F are diagrams for explaining an example of a process for causing a job image whose display position is moving to enter a state in which a user operation is prohibited. In the example illustrated in FIGS. 4A to 4F, as an initial state, the job management unit 111 holds five pieces of job information, and five job images are displayed as a job list on the display unit 113. A process for the case where printing of one of the five jobs is completed will be explained below.

First, as illustrated in FIG. 4A, the display unit 113 displays job images 11 to 15 as a job list. Jobs corresponding to the job images 11 to 15 will be referred to as a job A1, a job A2, a job A3, a job A4, and a job A5, respectively. That is, the job A1 is a scan job, the job A2 is a print job, the job A3 is a print job, the job A4 is a facsimile job, and the job A5 is a print job. In this example, in a state in which the display position of none of the job images is moving, the job images 11 to 15 are in a state in which a user operation is permitted. In such a state, for example, if a user performs an operation for selecting the job image 11, detailed information of the job A1, a button for canceling the job A1, and the like are displayed on the display unit 113.

Furthermore, when printing progresses and a change occurs in the progress status of the job A3, the display controller 112 updates the display contents of the job list, based on information of the job A3 obtained from the job management unit 111. For example, for the job A3 illustrated in FIG. 4A, document data of the fifth page of a six-page document is being printed. When document data of the sixth page starts to be printed, the display contents are updated.

Upon obtaining information of print completion of the job A3 from the job management unit 111, the display controller 112 deletes the job image 13 from the job list, as illustrated in FIG. 4B. By the deletion of the job image 13, the space in which the job image 13 was displayed becomes blank. Therefore, the display controller 112 moves the display positions of the job images (the job image 14 and the job image 15) that are positioned below the job image 13. That is, as illustrated in FIG. 4C, the job image 14 and the job image 15 start to move upwards (direction of the arrow). Then, as information of the display contents to be updated, the display controller 112 notifies the operation controller 115 that the job image 13 has been deleted and the job image 14 and the job image 15 have started to move.

When the job image 14 and the job image 15 start to move, the operation controller 115 causes the job image 14 and the job image 15 to enter a state in which a user operation is prohibited, as illustrated in FIG. 4D. On the other hand, the job image 11 and the job image 12 whose display positions do not move remain in the state in which a user operation is permitted.

Next, when the movement of the job image 14 and the job image 15 is completed, the display controller 112 notifies the operation controller 115 that the movement of the job image 14 and the job image 15 is completed, as information of the display contents to be updated. As illustrated in FIG. 4E, the operation controller 115 maintains the job image 14 and the job image 15 in the state in which an operation is prohibited for a predetermined time period (for example, for one second), even after the movement of the job image 14 and the job image 15 is completed.

Then, when the predetermined time period has passed, the operation controller 115 causes the job image 14 and the job image 15 to enter the state in which a user operation is permitted, as illustrated in FIG. 4F. At this time, all the job images displayed on the display unit 113 (job images 11 to 15) are in the state in which a user operation is permitted.

As described above, the operation controller 115 receives the display contents from the display controller 112, causes a job image to enter a state in which an operation is prohibited when the movement of the job image starts, and maintains the state until a predetermined time period has passed since completion of the movement.

For example, while the job image 14 and the job image 15 are moving as illustrated in FIG. 4C, the user may try to select the job image 14. In this case, since the job image 15 is moving upwards, the user may select the job image 15 against an intention of the user, instead of the job image 14. Thus, by causing the moving job image to enter the state in which a user operation is prohibited, for example, an erroneous operation which may occur when the user selects a job image is suppressed, compared with a configuration in which a moving job image remains in the state in which an operation is permitted. Furthermore, even in such a case, a job image that does not move remains in the state in which an operation is permitted. Therefore, a user operation for the job image that does not move is not interrupted.

Furthermore, by causing a moved job image to enter the state in which an operation is permitted after the predetermined time period has passed since completion of the movement of the job image, a waiting time is generated for the user to confirm the image position after the movement. Therefore, by causing the job image to reenter the state in which an operation is permitted when the predetermined time period has passed since the completion of the movement of the job image, an erroneous operation which may occur when the user selects a job image is suppressed, compared with a configuration in which a predetermined time period is not provided.

Next, another example of the process for updating display contents of a job list will be described. FIG. 5A and FIG. 5B are diagrams for explaining an example of a process for causing a job image to enter a state in which a user operation is prohibited before the display position of the job image moves. In the example illustrated in FIGS. 5A and 5B, similarly to FIGS. 4A to 4F, the job management unit 111 holds five pieces of information for the jobs A1 to A5, and the display unit 113 displays the job images 11 to 15, which correspond to the job A1 to A5, respectively. Furthermore, printing for the print job A3 is being executed.

First, as illustrated in FIG. 5A, the display unit 113 displays the job images 11 to 15 as a job list. In this example, the job A3 is a job for printing document data of six pages in total. At the present, the job A3 is in a state in which document data of the third page is being printed. In this state, the job images 11 to 15 are in a state in which a user operation is permitted.

Next, the printing of the job A3 progresses, and document data of the fourth page starts to be printed, as illustrated in FIG. 5B. In this state, there are three pages remaining to print in the job A3 (that is, document data of the fourth to sixth pages), which indicates that the printing will be completed in a short time. At this time, the display controller 112 notifies the operation controller 115 that the document data of the fourth page has started to be printed for the job A3, as information of the display contents to be updated.

Then, the operation controller 115 determines that the completion of printing for the job A3 is approaching, based on the information of the display contents received from the display controller 112. In this example, for example, for a print job, the number of remaining pages (three pages, for the example illustrated in FIGS. 5A and 5B) of document data to determine that the completion of the print job is approaching is set beforehand. Therefore, when the number of remaining pages for the print job being executed has reached a predetermined value, the operation controller 115 determines that the completion of the print job is approaching.

When determining that the completion of the printing for the job A3 is approaching, the operation controller 115 causes the other job images (for the example of FIGS. 5A and 5B, the job image 14 and the job image 15) whose display positions move due to the completion of the job A3 and deletion of the job image 13 from the job list to enter a state in which a user operation is prohibited. That is, although the job image 14 and the job image 15 have not started to move, since the completion of the job A3 is approaching and the start of the movement is approaching accordingly, the job image 14 and the job image 15 enter the state in which an operation is prohibited.

Thus, when the completion of the job that is being executed is approaching, the operation controller 115 causes a job image that is to move by the completion of the job to enter the state in which an operation is prohibited. By causing the job image to enter the state in which an operation is prohibited even before the job image starts to move, for example, an erroneous operation which may occur when the user selects a job image is suppressed, compared with the configuration in which the job image enters the state in which an operation is prohibited after the job image starts to move.

Furthermore, in the example illustrated in FIGS. 5A and 5B, the case where the print job, such as the job A3, is completed has been described. However, the process for causing a job image to enter the state in which an operation is prohibited before the job image starts to move is not intended to be limited to the above configuration. If the total amount of work performed by a job is set, the remaining work amount is calculated. Therefore, by setting beforehand the remaining amount of work which is to be used for determining that the completion of a job is approaching, the determination as to whether or not the completion of the job is approaching becomes possible. Thus, when a job whose total amount of work has been set is being executed, before a job image is deleted and a different job image starts to move, an operation for the different job image may be restricted. For example, in the case where document data of eight pages in total is transmitted to an external apparatus as a facsimile job, at the time when the number of remaining pages of the document data to transmit becomes three pages, a job image which is to move when the facsimile job is completed enters the state in which an operation is prohibited.

Furthermore, another example of the process for updating display contents of a job list will be described. FIGS. 6A to 6D are diagrams for explaining another example of the process for causing a job image whose display position is moving to enter a state in which a user operation is prohibited. In the examples illustrated in FIGS. 4A to 4F and FIGS. 5A and 5B, a job image is deleted from the job list. In the example illustrated in FIGS. 6A to 6D, however, a job image is newly added to the job list. In the example illustrated in FIGS. 6A to 6D, similarly to the example of FIGS. 4A to 4F, the job management unit 111 holds five pieces of information for the job A1 to A5, and the display unit 113 displays the job images 11 to 15, which correspond to the job A1 to A5, respectively. Furthermore, a job A6, which is a print job, is newly added.

First, as illustrated in FIG. 6A, the display unit 113 displays the job images 11 to 15 as the job list. In this state, the job images 11 to 15 are in a state in which a user operation is permitted. Next, for example, a print instruction is transmitted from another external apparatus, and the new job A6 is added to the job management unit 111. A job image 16, which is an image of the added job A6, is added to the top of the job list. Therefore, as illustrated in FIG. 6B, the display controller 112 moves the display positions of the job images which are located below the position in which the job image 16 is to be added, that is, the job images 11 to 15, in a downward direction (direction of the arrow). Then, the display controller 112 notifies the operation controller 115 that the movement of the job images 11 to 15 has started to add the job image 16, as information of the display contents to be updated.

When the job images 11 to 15 start to move, the operation controller 115 causes the job images 11 to 15 to enter a state in which a user operation is prohibited, as illustrates in FIG. 6B. Next, the display controller 112 moves the job images 11 to 15 downwards and adds the job image 16 in the blank area at the top of the job list, as illustrated in FIG. 6C. When the movement of the job images 11 to 15 is completed and the job image 16 is added, the display controller 112 notifies the operation controller 115 that the movement of the job images 11 to 15 and the addition of the job image 16 are completed, as information of the display contents to be updated.

The operation controller 115 maintains the job images 11 to 14 and the job image 16 in the state in which an operation is prohibited for a predetermined time period (for example, for one second) even after the movement of the job images 11 to 15 and the addition of the job image 16 are completed, as illustrated in FIG. 6C. In the example illustrated in FIG. 6C, the job image 15 has moved to an area outside the display unit 113, and the image remains in the state in which a user operation is prohibited. Furthermore, after the predetermined time period has passed, the operation controller 115 causes the job images 11 to 16 to enter a state in which a user operation is permitted, as illustrated in FIG. 6D.

Thus, in the case where a job image is added to a job list, the operation controller 115 causes a different job image to enter the state in which a user operation is prohibited when the different job image starts to move and maintains the state until the predetermined time period has passed since completion of the movement. Furthermore, the operation controller 115 causes the added job image to enter the state in which a user operation is prohibited until the predetermined time period has passed since the addition of the job image. With this configuration, an erroneous operation which may occur when the user selects a job image is suppressed.

Furthermore, in the example illustrated in FIGS. 6A to 6D, the newly added job image 16 is added to the top of the job list. However, the present invention is not intended to be limited to the above configuration. For example, the job image 16 may be added in an intermediate position of the job list, such as a position between the job image 12 and the job image 13. In this case, the jobs (job images 13 to 15) whose display positions move due to the addition of the job image 16, enter the state in which an operation is prohibited.

Furthermore, for example, when jobs are arranged into groups or when jobs are sorted in a job list, a newly added job image may be added to an intermediate position of the job list. As an example of grouping, for example, jobs may be divided by type, such as a scan job, a print job, a facsimile job, and the like. Furthermore, as an example of sorting, for example, jobs may be sorted by job information, such as the user name of a user who issued an instruction for generating a job, and the date and time when a job was generated.

Figure 7A:
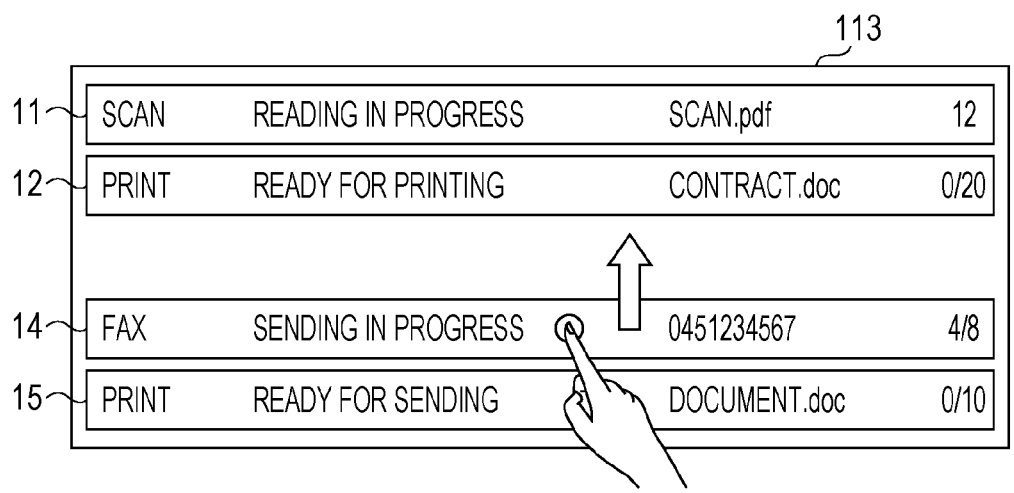
FIGS. 7A and 7B are diagrams for explaining an example of a process for allowing a user to confirm whether or not to perform a job operation.
Figure 7B:
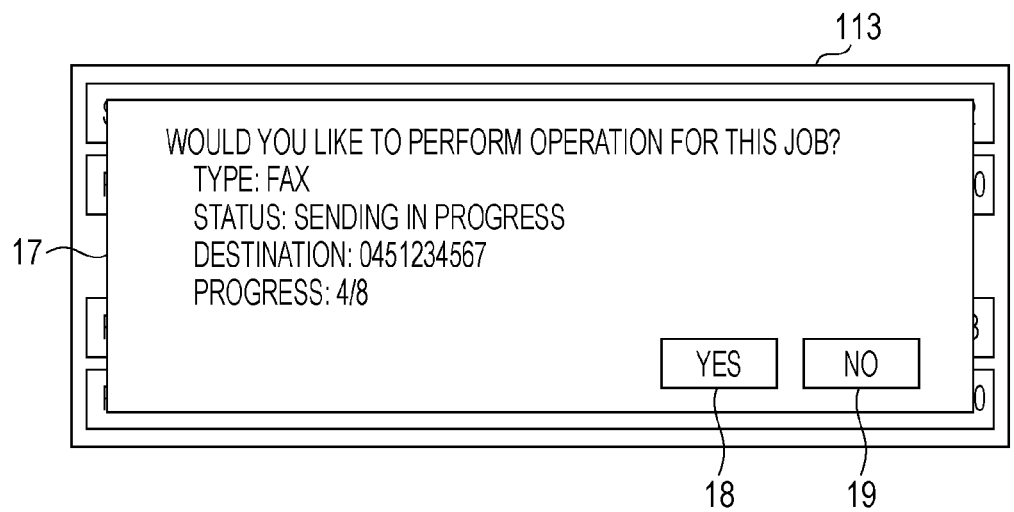

Furthermore, in the examples illustrated in FIGS. 4A to 4F, 5A and 5B, and 6A to 6D, a user operation for a moving job image is not accepted. However, when an operation for a moving job image is performed, a determination as to whether or not to accept the operation for the job image may be confirmed by a user. FIGS. 7A and 7B are diagrams for explaining an example of a process for allowing a user to confirm whether or not to accept an operation for a job.

In the example illustrated in FIG. 7A, similarly to FIG. 4C, the job image 13 has been deleted, and the job image 14 and the job image 15 move upwards (direction of the arrow). When a user performs an operation for selecting the job image 14, the display controller 112 displays a confirmation screen for confirming whether or not to accept the operation for the job A4 for the selected job image 14.

FIG. 7B is a diagram illustrating an example of a confirmation screen 17 displayed on the display unit 113. In the example illustrated in FIG. 7B, on the confirmation screen 17, information regarding the job A4 for the selected job image 14 is displayed. Furthermore, on the confirmation screen 17, buttons for selecting whether or not to accept the operation for the job A4 is displayed. When the user selects a "YES" button 18, the operation for the job A4 is accepted. In this case, for example, detailed information of the job A4 is displayed and a button for canceling the job A4 is displayed. Furthermore, when the user selects a "NO" button 19, the operation for the job A4 is not accepted. In this case, for example, the confirmation screen 17 disappears, and the movement of the job image 14 and the job image 15 continue.

As described above, when an operation is performed for a moving job image, the display controller 112 displays a confirmation screen for confirming whether or not to accept the operation for the job image. Therefore, for example, compared with a configuration in which a moving job image remains in a state in which an operation is permitted, an erroneous operation which may occur when the user selects a job is suppressed. Furthermore, compared with a configuration in which a moving job image enters a state in which an operation is prohibited, when the user desires to perform an operation for a moving job image, the operation for the moving job image is accepted.

Figure 8A:
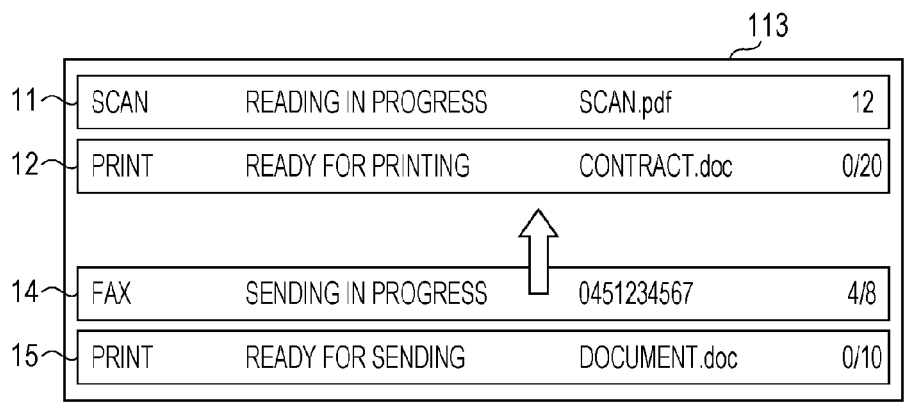
FIGS. 8A to 8C are diagrams for explaining an example of a process for displaying a job image for which an operation is prohibited in a different color.
Figure 8B:
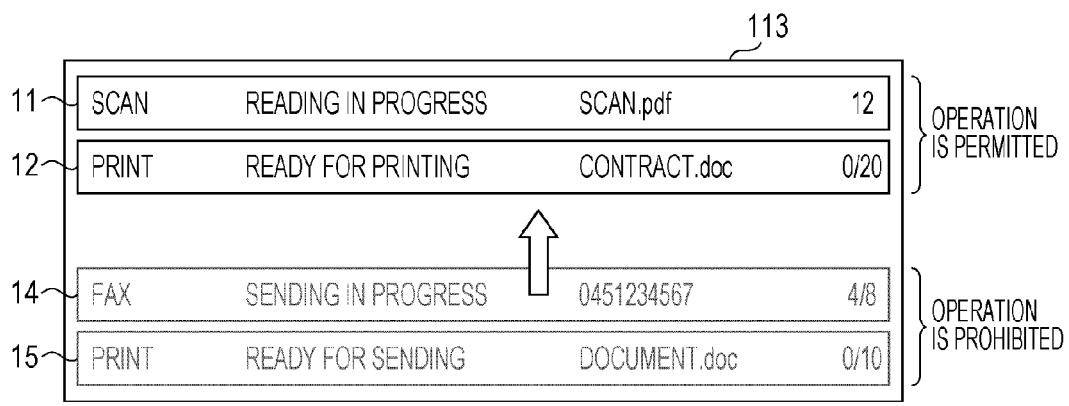
Figure 8C:
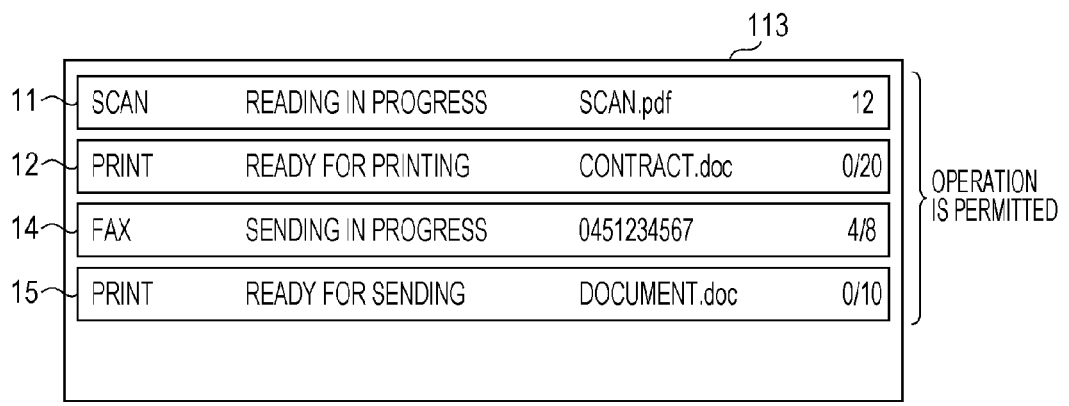

Furthermore, in the examples illustrated in FIGS. 4A to 4F, 5A and 5B, and FIGS. 6A to 6D, a job image which has entered the state in which an operation is prohibited may be displayed in a color different from a job image in a state in which an operation is permitted. FIGS. 8A to 8C are diagrams for explaining an example of a process for displaying a job image for which an operation is prohibited in a different color.

In the example illustrated in FIG. 8A, similarly to FIG. 4C, the job image 13 has been deleted, and the job image 14 and the job image 15 move upwards (direction of the arrow). When the job image 14 and the job image 15 start to move and enter a state in which an operation is prohibited, the display controller 112 displays the job image 14 and the job image 15 in a color different from a color used for a job image for which an operation is permitted, as illustrated in FIG. 8B. When the color of the job image 14 and the job image 15 is changed into gray, the job images enter a so-called gray-out state.

Then, when a predetermined time period has passed since completion of the movement of the job image 14 and the job image 15, the job image 14 and the job image 15 enter a state in which an operation is permitted. When the job image 14 and the job image 15 enter the state in which an operation is permitted, the display controller 112 displays the job image 14 and the job image 15 back in the original color, as illustrated in FIG. 8C.

Thus, by changing the color of a job image which has entered the state in which an operation is prohibited, it is easier for a user to recognize that the job is in the state in which an operation is prohibited. Furthermore, in the example illustrated in FIGS. 8A to 8C, the image that has entered the state in which an operation is prohibited is displayed in a different color. However, any configuration may be used as long as the display mode of the image is changed. For example, an image which indicates that an operation is prohibited may be newly added to a job image which has entered the state in which an operation is prohibited, or the job image may be displayed smaller when the job enters the state in which an operation is prohibited.

Figure 9A:
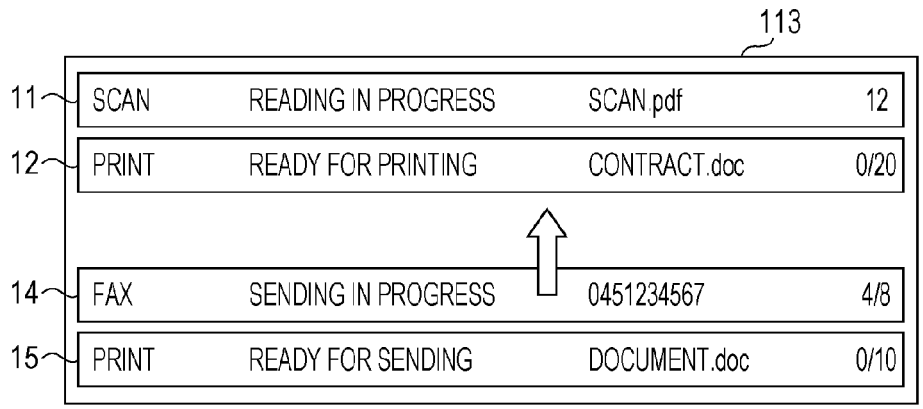
FIGS. 9A to 9C are diagrams for explaining an example of a process for hiding a job image for which an operation is prohibited.
Figure 9B:
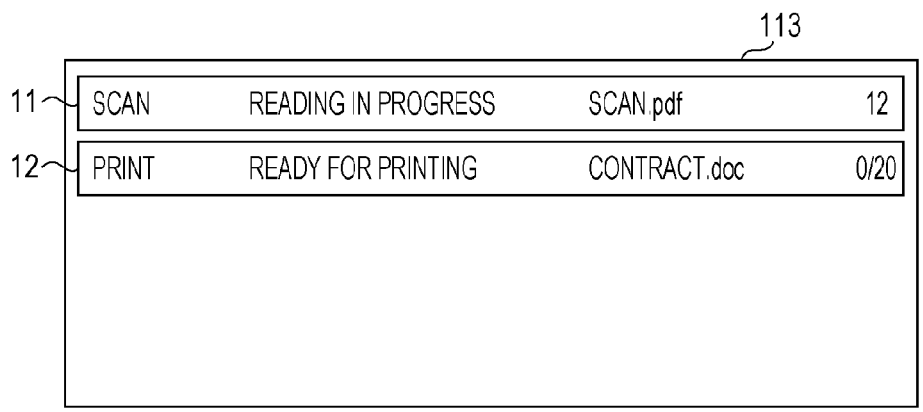
Figure 9C:
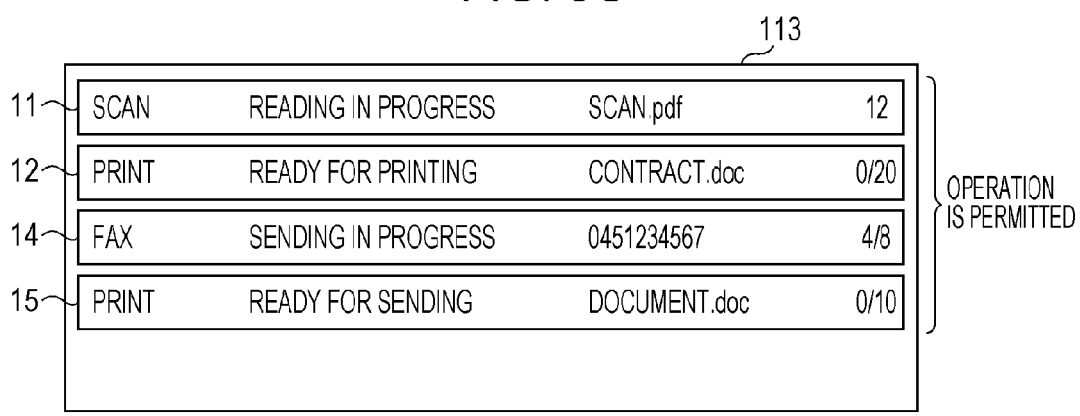

Furthermore, in the examples illustrated in FIGS. 4A to 4F, FIGS. 5A and 5B, and FIGS. 6A to 6D, a job image that has entered the state in which an operation is prohibited, may be hidden. FIGS. 9A to 9C are diagrams for explaining an example of a process for hiding a job image for which an operation is prohibited.

In the example illustrated in FIG. 9A, similarly to FIG. 4C, the job image 13 has been deleted, and the job image 14 and the job image 15 move upwards (direction of the arrow). When the job image 14 and the job image 15 start to move and enter a state in which an operation is prohibited, the display controller 112 hides the job image 14 and the job image 15, as illustrated in FIG. 9B.

Then, when the movement of the job image 14 and the job image 15 is completed, the job image 14 and the job image 15 enter a state in which an operation is permitted. When the job image 14 and the job image 15 enter the state in which an operation is permitted, the display controller 112 displays the job image 14 and the job image 15 again, as illustrates in FIG. 9C.

Thus, by hiding a job image which has entered the state in which an operation is prohibited, the operation itself by a user for the moving job image becomes difficult. Thus, an erroneous operation which may occur when the user selects a job image is suppressed.

Furthermore, a predetermined time period may be provided as a period from completion of the movement and redisplay of the job image 14 and the job image 15 until entry to the state in which an operation is permitted. By providing the predetermined time period, a waiting time is generated for the user to confirm a new image position. Therefore, compared with a configuration in which a predetermined time period is not provided, an erroneous operation which may occur when the user selects a job is suppressed.

Furthermore, in the foregoing exemplary embodiment, the case where a job image moves by execution of a job by the image processing apparatus 10 has been described. However, the present invention is not intended to be limited to the above configuration. For example, a user may move a job image by performing a drag operation on the touch panel. In this case, for example, when the job image moves by the operation by the user and the display position of a different job image moves accordingly, the different moving job image enters a state in which a user operation is prohibited. Incidentally, an action of a job image which causes the display position of a different job image to move may be, for example, deletion of the job image by completion or cancellation of a job, addition of the job image by a new job, movement of the job image by a user operation, or the like as long as the display position of the job image changes.

Furthermore, in the foregoing exemplary embodiment, the image processing apparatus 100 includes the touch panel, and a user contacts the screen to perform an operation. However, the present invention is not intended to be limited to the above configuration. For example, the image processing apparatus 100 may include a pointing device, such as a mouse, and the operation acceptance unit 114 may accept an operation by a user using the pointing device. Moreover, for example, the image processing apparatus 100 may include an input unit, such as an input button, and the operation acceptance unit 114 may accept an operation by a user using the input button.

<Another Example of Hardware Configuration>

Furthermore, although the configuration including the image processing apparatus 100 has been described above, a function for displaying a job list may be implemented by a different apparatus which includes a display mechanism, such as a personal computer (PC) or a portable information terminal (a so-called smartphone, a tablet terminal, or the like). On the assumption that a computer 200, such as a PC or a portable information terminal, is used instead of the image processing apparatus 100, a hardware configuration of the computer 200 will be described below.

Figure 10:
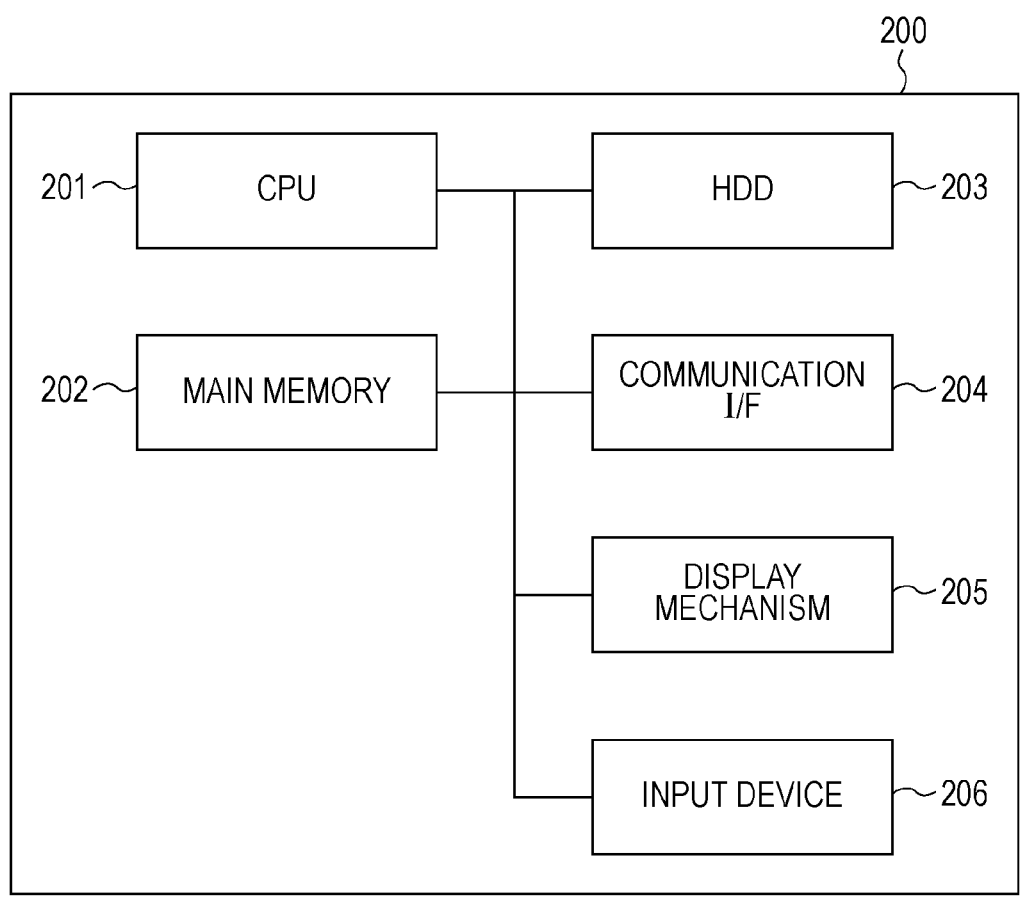
FIG. 10 is a diagram illustrating an example of a hardware configuration of a computer to which an exemplary embodiment is applied.

FIG. 10 is a diagram illustrating an example of a hardware configuration of the computer 200 to which an exemplary embodiment is applied. As illustrated in FIG. 10, the computer 200 includes a CPU 201 as an arithmetic unit, and a main memory 202 and a hard disk drive (HDD) 203 as a storage unit. The CPU 201 executes various programs, such as an OS and an application, to implement each function of the computer 200. Furthermore, the main memory 202 stores the various programs, data to be used for the execution of the programs, and the like, and the HDD 203 stores input data for the various programs, output data from the various programs, and the like. Moreover, the computer 200 includes a communication interface (I/F) 204 for external communication, a display mechanism 205 including a touch panel, and an input device 206 such as a keyboard and a mouse.

Furthermore, although processing related to image data, such as a print job, a scan job, or a facsimile job has been described as a job in the foregoing exemplary embodiment, the present invention is not intended to be limited to this. A job may be any type of processing as long as it is performed by an apparatus, such as the image processing apparatus 100 or the computer 200, and is able to be displayed as a list. Moreover, a job image is an image representing a job. However, a job image may be of any type as long as the image indicates processing represented in a list. For example, an item in which a character string or the like is displayed is also considered as a job image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a display configured to display a list of processing images, each of which is an image representing a unit of processing; and
an acceptance controller configured to restrict acceptance of an operation for a different processing image whose display position moves in accordance with an action of one processing image,
wherein the operation is a user input to the display.

2. The display apparatus according to claim 1, wherein when the display position of the different processing image moves, the acceptance controller is configured to maintain a state in which an operation for a processing image whose display position does not move is acceptable.

3. The display apparatus according to claim 1, wherein the acceptance controller is configured to restrict acceptance of an operation for the different processing image with an action of deleting the one processing image from the list.

4. The display apparatus according to claim 1, wherein the acceptance controller is configured to restrict acceptance of an operation for the different processing image in accordance with an action of newly adding the one processing image to the list.

5. The display apparatus according to claim 1, wherein in response to a predetermined time period being passed since completion of movement of the display position of the different processing image, the acceptance controller is configured to control the different processing image to enter a state in which an operation is acceptable.

6. The display apparatus according to claim 1, wherein in response to an operation for the different processing image whose display position moves is performed, the display is configured to display an image which allows a user to select whether or not to accept an operation for the different processing image.

7. A non-transitory computer readable medium storing a program causing a computer to execute a display process, the process comprising:
displaying on a display a list of processing images, each of which is an image representing a unit of processing; and
restricting acceptance of an operation for a different processing image whose display position moves in accordance with an action of one processing image,
wherein the operation is a user input to the display.

8. A display apparatus comprising:
a display configured to display a list of processing images, each of which is an image representing a unit of processing; and
an acceptance controller configured to restrict acceptance of an operation for a different processing image whose display position moves in accordance with an action of one processing image,
wherein the operation is configured to cause the display to display detailed information of the selected job or a cancellation button.

9. The display apparatus according to claim 8, wherein when the display position of the different processing image moves, the acceptance controller is configured to maintain a state in which an operation for a processing image whose display position does not move is acceptable.

10. The display apparatus according to claim 8, wherein the acceptance controller is configured to restrict acceptance of an operation for the different processing image with an action of deleting the one processing image from the list.

11. The display apparatus according to claim 8, wherein the acceptance controller is configured to restrict acceptance of an operation for the different processing image in accordance with an action of newly adding the one processing image to the list.

12. The display apparatus according to claim 8, wherein in response to a predetermined time period being passed since completion of movement of the display position of the different processing image, the acceptance controller is configured to control the different processing image to enter a state in which an operation is acceptable.

13. The display apparatus according to claim 8, wherein in response to an operation for the different processing image whose display position moves is performed, the display is configured to display an image which allows a user to select whether or not to accept an operation for the different processing image.

14. A non-transitory computer readable medium storing a program causing a computer to execute a display process, the process comprising:

displaying on a display a list of processing images, each of which is an image representing a unit of processing; and restricting acceptance of an operation for a different processing image whose display position moves in accordance with an action of one processing image, wherein the operation is configured to cause the display to display detailed information of the selected job or a cancellation button.

\* \* \* \* \*